(12) United States Patent
Nguyen et al.

(10) Patent No.: US 9,253,317 B2
(45) Date of Patent: Feb. 2, 2016

(54) SYSTEM AND METHOD TO TRACK AND LOG MOBILE COMMUNICATION DEVICE CALL STATUS WHEN THE DEVICE IS NOT IN POSSESSION

(71) Applicant: EchoStar Technologies L.L.C., Englewood, CO (US)

(72) Inventors: Phuc H. Nguyen, Parker, CO (US); Christopher William Bruhn, Aurora, CO (US)

(73) Assignee: ECHOSTAR TECHNOLOGIES L.L.C., Englewood, CO (US)

(*) Notice: Subject to any disclaimer, the term of this patent is extended or adjusted under 35 U.S.C. 154(b) by 44 days.

(21) Appl. No.: 14/017,106

(22) Filed: Sep. 3, 2013

(65) Prior Publication Data

US 2015/0065097 A1    Mar. 5, 2015

(51) Int. Cl.
| | | |
|---|---|---|
| H04M 3/42 | (2006.01) | |
| H04M 1/00 | (2006.01) | |
| H04M 1/57 | (2006.01) | |
| H04N 21/436 | (2011.01) | |
| H04N 21/414 | (2011.01) | |
| H04N 21/4363 | (2011.01) | |
| H04N 21/41 | (2011.01) | |
| H04N 21/488 | (2011.01) | |
| H04N 21/00 | (2011.01) | |
| H04L 12/28 | (2006.01) | |
| H04W 4/16 | (2009.01) | |

(52) U.S. Cl.
CPC ....... *H04M 3/42263* (2013.01); *H04L 12/2803* (2013.01); *H04M 1/006* (2013.01); *H04N 21/00* (2013.01); *H04N 21/4131* (2013.01); *H04N 21/41407* (2013.01); *H04N 21/43615* (2013.01); *H04N 21/43637* (2013.01); *H04N 21/4882* (2013.01); *H04W 4/16* (2013.01); *H04M 1/57* (2013.01)

(58) Field of Classification Search
CPC .............. H04L 29/08108; H04L 12/2803; H04M 2207/18; H04M 3/533; H04M 1/6505; H04M 1/276; H04M 2201/40; H04M 3/42263; H04M 1/006; H04M 1/57; H04W 4/02; H04W 4/12; H04W 4/16; H04N 21/43615; H04N 21/41407; H04N 21/43637; H04N 21/00
USPC ........ 455/414.1, 403, 412.1, 412.2, 413, 455/414.2, 415, 411, 414.3, 423, 424, 425, 455/426.1, 426.2, 418–420, 417, 455/556.1–556.2; 370/88.08, 88.11, 88.12, 370/88.13, 88.14; 379/67.1, 68, 69, 70
See application file for complete search history.

(56) References Cited

U.S. PATENT DOCUMENTS

| 6,799,017 | B1 * | 9/2004 | Kregel | ............................ 455/70 |
| 7,050,798 | B2 * | 5/2006 | Ranta | ............................ 455/423 |
| 8,060,068 | B1 * | 11/2011 | Mangal | ........................ 455/415 |

(Continued)

*Primary Examiner* — Brandon Miller
(74) *Attorney, Agent, or Firm* — Seed IP Law Group PLLC (57) ABSTRACT

A mobile device logging and tracking system permits a communicative association between a mobile device and a receiving device. When the mobile device communicates data including an indication of an unanswered call to the receiving device, the receiving device is configured to store the data in a memory. The memory may be local or remote from the receiving device. The receiving device may then communicate information associated with the unanswered call to a first electronic device, which may be an appliance, a gaming system, another mobile communication device, or some other device having computing capability.

17 Claims, 6 Drawing Sheets

(56) References Cited

U.S. PATENT DOCUMENTS

| | | | | |
|---|---|---|---|---|
| 8,565,731 | B2* | 10/2013 | Lynch | 455/412.2 |
| 8,804,922 | B2* | 8/2014 | Lin et al. | 379/88.22 |
| 2003/0012353 | A1* | 1/2003 | Tang et al. | 379/142.17 |
| 2009/0098880 | A1* | 4/2009 | Lindquist | 455/456.1 |
| 2009/0290692 | A1* | 11/2009 | Fong et al. | 379/88.14 |
| 2012/0286965 | A1* | 11/2012 | Rautiainen | 340/670 |
| 2012/0323520 | A1* | 12/2012 | Keal | 702/141 |
| 2013/0331098 | A1* | 12/2013 | Balasubramaniyan et al. | 455/434 |

* cited by examiner

SYSTEM AND METHOD TO TRACK AND LOG MOBILE COMMUNICATION DEVICE CALL STATUS WHEN THE DEVICE IS NOT IN POSSESSION

BACKGROUND

1. Technical Field

The present disclosure generally relates to services associated with mobile communication devices and more particularly, but not exclusively, relates to services associated with an unanswered call.

2. Description of the Related Art

Mobile communication devices have become ubiquitous in everyday life. People use wireless mobile communication devices throughout the entire day when they are awake, and often, their mobile communication device remains nearby when they sleep. Occasionally, a person loses or misplaces a mobile communication device. In such cases, the person will often make finding their mobile communication device their highest priority. In other cases, a person will set their mobile communication device down, become preoccupied in another activity, and then leave the area where they set the mobile communication device down. In these cases, the mobile communication device may not be lost or misplaced, but the user will miss a phone call that is directed to the mobile communication device.

BRIEF SUMMARY

A new mobile device logging and tracking system operates in conjunction with mobile communication devices (e.g., smart phones) and receiving devices (e.g., set top boxes) found in many homes and businesses. The mobile device logging and tracking adds certain logic modules to conventional mobile communication devices and receiving devices.

A mobile communication device typically includes a transceiver configured for short range communication (e.g., a Bluetooth transceiver). Often, a receiving device includes a transceiver configured for short range communication. When certain logic modules are added to the mobile communication device and the receiving device, an indicator of an unanswered call can be communicated during certain circumstances to the receiving device.

A method to log calls to a mobile device may be summarized as including communicatively associating the mobile device with a receiving device; receiving data with the receiving device from the mobile device, the data including an indication that a call to the mobile device was not answered; and storing the data in a memory associated with the receiving device.

A receiving device may be summarized as including a first transceiver configured for communicative coupling to at least one mobile device; a second transceiver configured to communicate data to a computing device, the data indicating that a call to the mobile device is unanswered; a processing unit configured to direct the receiving device to: accept a communication request from the mobile device via the first transceiver; accept information from the mobile device, the information associated with the call to the mobile device that is unanswered; and transmit an indication of the unanswered call to the computing device via the second transceiver.

A computer readable medium arranged to store software instructions, the software instructions, when executed by a processor of a mobile device, arranged to direct the mobile device to perform acts, may be summarized as including storing a communication profile, the profile defining an association with a receiving device; identifying a current period of inactivity; identifying a current period of non-motion; receiving an indication of an incoming call during the current period of inactivity and the current period of non-motion; initiating a communicative link to the receiving device according to the communication profile and based on the received indication of the incoming call; and communicating information associated with the incoming call to the receiving device via the communicative link.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
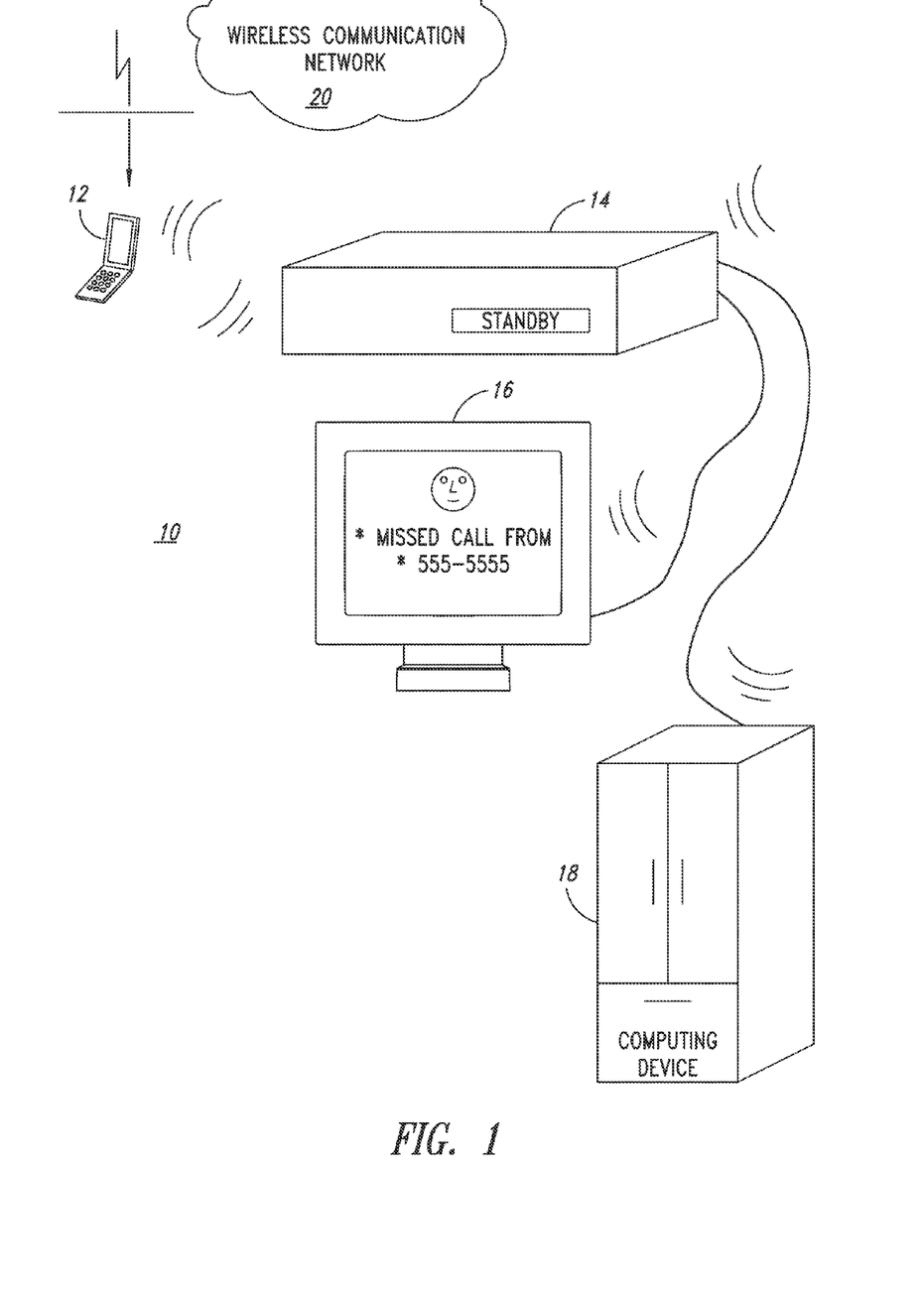
FIG. 1 is a mobile device logging and tracking system embodiment.

FIG. 1 illustrates a mobile device logging and tracking system embodiment 10 as a block diagram. A mobile communication device 12 is configured to communicatively associate with a receiving device 14. The receiving device 14 is communicatively coupled to a first computing device 16 (i.e., a presentation device) and a second computing device 18 (i.e., a smart refrigerator). The communication between devices may be wired communication, wireless communication, or a combination of wired and wireless communication.

In one embodiment, a user leaves her mobile communication device 12 somewhere in her house, and she then moves to another location in her house. The mobile communication device 12 is not necessarily in close proximity to the user, but the mobile communication device 12 may be in communication range of a receiving device 14. The mobile communication device 12 is configured for operation in a wireless telecommunication network 20. A friend of the user calls her, and an indication of the call is passed through the wireless network 20 to the mobile communication device 12. Since the user is no longer near her mobile communication device 12, she is unaware that the mobile communication device 12 is receiving a call. The call is unanswered. Nevertheless, the mobile communication device 12 is configured to associate with the receiving device 14. The mobile communication device 12 passes data to the receiving device 14, and the data includes an indication that a call to the mobile communication device 12 was not answered. The data may also include additional information such as the telephone number of the caller, an image associated with the caller (e.g., the caller's photograph), a time and date stamp, a text message, voicemail, video mail, and other information.

Upon receiving the data, the receiving 14 device will process and communicate the data to one or more computing devices. In one case, the information is communicated to the first computing device 16, which is illustrated in FIG. 1 as a presentation display device. Alternatively, or in addition, the information is communicated to the second computing device 18, which is illustrated in FIG. 1 as a smart appliance (e.g., a refrigerator). The presentation device 16 may pass text/audio/visual information to one or more outputs. The smart refrigerator may flash lights, output a sound, put a message on a display, or provide some other indication of the information to a user.

Figure 2:
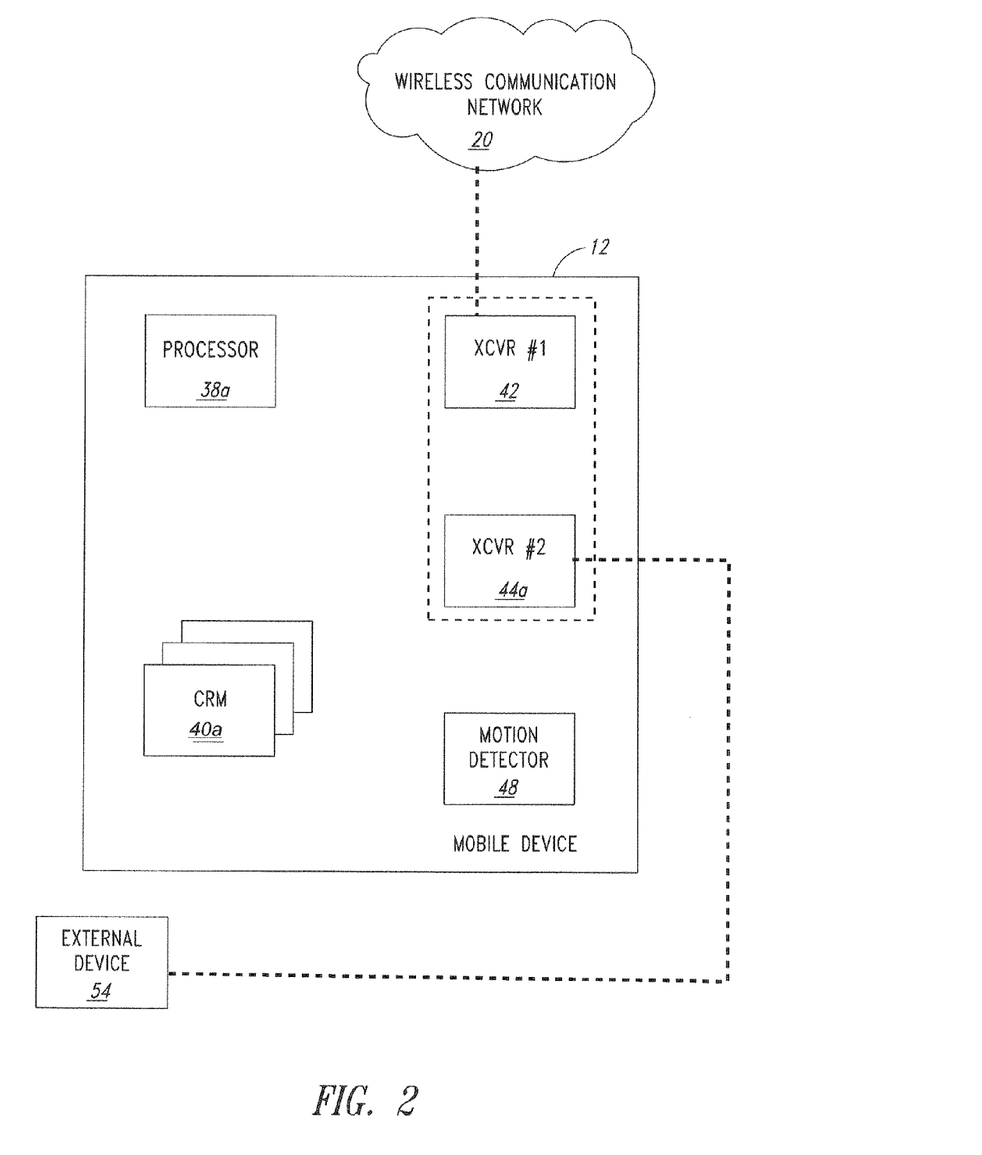
FIG. 2 is a wireless mobile device block diagram.

FIG. 2 is a block diagram for a mobile communication device 12. The mobile communication device 12 is a wireless device associated with a wireless telecommunications network. The mobile communication device 12 may be used for business, pleasure, safety, and many other reasons. Many conventional mobile communication devices are used both for voice communications as well as for data communications. For example, people use their mobile communication devices to talk to other people, to interact with Internet web pages on mobile communication devices, to send and receive text and audio/visual messages, to receive geographical positioning information, and many other things.

The people that use mobile communication devices refer to the underlying telecommunications network with a wide variety of names. For example, the wireless telecommunication network 20 referenced herein may alternatively be known as a commercial wireless network, a cellular network, a mobile network, and any combination of same or similar words. The term wireless telecommunication network as used herein is intended to broadly encompass any wide area commercial wireless telecommunications network. It is to be appreciated that the wireless telecommunication network 20 may include both wired and wireless infrastructure; for example, transceivers, repeaters, switches, antennas, access points, routers, public switched telephone networks, codecs, multiplexers, de-multiplexers, and the like.

The operators of the wireless telecommunications network 20 permit some mobile communication devices to access and communicate over the wireless telecommunications network 20. Generally, users of mobile communication devices 12 pay the operators for using the wireless communications network.

The users of mobile communication devices 12 that communicate via the wireless telecommunications network 20 include individuals and other computing devices. The mobile communication devices 12 and users of the mobile communication devices are interchangeably referenced herein as users, mobile devices, clients, cell phones, smartphones, and any combination of same or similar words.

The block diagram of FIG. 2 illustrates several components of mobile communications device 12. The mobile communication device 12 is electronic communications devices having a processing unit 38a and a volatile and/or non-volatile computer readable memory 40a. The memory 40a stores instructions and data acted on by processing unit 38a. The mobile communication device 12 may also include one or more transceivers 42, 44a and a motion detection device 48.

The processing unit 38a may be a single processing unit or a formation of multiple processing units. The processing unit 38a may be or include field programmable gate arrays (FPGA), application specific integrated circuits (ASIC), digital signal processors (DSP), central processing units (CPU), or other like devices. The processing unit 38a of a mobile communication device 12 may be broadly referenced herein as a CPU.

Memory 40a comprises any combination of volatile and non-volatile non-transitory computer-readable media (CRM) for reading and writing. Volatile computer-readable media includes, for example, random access memory (RAM). Non-volatile computer-readable media includes, for example, read only memory (ROM), magnetic media such as a hard disk, an optical disk drive, a flash memory device, a CD-ROM, and/or the like.

Inside memory 40a, a particular collection of software instructions are executed by the processing unit 38a in order to carry out some functions of the mobile device logging and tracking system 10. The software instructions operatively configure hardware and other software in the mobile device 12 so that information related to unanswered calls may be optionally communicated to a receiving device. The information related to unanswered calls, identifying information related to known contacts, and other data may be stored in a file system in memory 40a.

The mobile communication device 12 further includes a collection of input/output circuits such as a first transceiver 42 and a second transceiver 44a. The first transceiver 42 may be suitably configured for communications through the wireless telecommunication network 20. The first transceiver 42 may operate according to a Global System for Mobile Communications (GSM) protocol, a Carrier Detect Multiple Access (CDMA) protocol, or some other protocol.

The second transceiver 44a may be suitably configured for communications over short distances to and from the mobile communication device 12 to another device such as receiving device 14. The communication may be carried out via one or more wireless circuits and/or protocols, for example, but not limited to, WiFi, Bluetooth, ZigBee/RF4CE, IEEE 1394 FireWire, infrared, ultra-high frequency (UHF) or another radio frequency (RF), and the like.

The second transceiver 44a can be configured to couple (i.e., communicatively associate) the mobile communication device 12 to other computing apparatuses in a direct one-to-one communication environment, in a personal area network (PAN) environment, in a local area network (LAN), or in another communicative configuration. For example, in one embodiment, the mobile communication device 12 has a Bluetooth radio chipset that is operatively used to communicate with a corresponding Bluetooth radio chipset of the receiving device 14. As another example, the mobile communication device 12 and the receiving device 14 may have hardware and software configured to communicate via an IEEE 802.11 protocol. In some embodiments, the communicative association between a wireless circuit of the mobile communication device 12 and a wireless circuit of the receiving device 14 is based on proximity, signal availability, and/or the like.

The second transceiver 44a enables the mobile communication device 12 to communicate with receiving device 14 or another external device 54. Other external devices 54 include headsets, speakers, other mobile devices, WiFi access points, facsimile machines, printers, global positioning devices (GPS), cameras, computers, and other like devices.

The transceivers of FIG. 2 may be implemented in a single transceiver circuit or multiple transceiver circuits. For example, the mobile communication device 12 may include a first transceiver 42 that is comprised of one or more GSM chipsets configured to communicate on several frequency bands. The second transceiver 44a may include a WiFi chipset, a Bluetooth chipset, an infrared output device and detection device, and other separately identifiable logic modules. Generally speaking, the transceivers of FIG. 2 are illustrated as having wide area network (WAN) access, local area network (LAN) access, or personal area network (PAN) access, but other configurations of modules are recognized.

A motion detector 48 may optionally be arranged in the mobile communication device 12. The motion detector 48 may be an electrical device, a mechanical device, or an electro-mechanical device (e.g., a MEMs device). The motion detector 48 may be used to operationally determine whether or not the mobile communication device 12 is in a state of motion or a state of non-motion. In some cases, the functions of the mobile device logging and tracking system 10 are performed after the mobile communication device 12 detects and identifies a current period of non-motion.

In some cases, when a current period of non-motion is detected, the mobile communication device 12 will further detect an incoming call that is unanswered. In these cases, the mobile communication device 12 may pass information about the unanswered call to a receiving device 14. In some cases, the period of non-motion is established after a predetermined time such as some number of seconds. The predetermined time may preferably be recognized as a threshold. The threshold may be stored in memory 40a. The threshold may be fixed or, optionally, the current period of non-motion threshold can be programmatically established via a user interface or via another means. For example, in some embodiments, a user is able to enter a value that is stored in a current period of non-motion threshold variable in memory 40a.

The memory 40a may further store a "current period of inactivity" threshold. The current period of inactivity may be implemented with a counter, a clock, or by some other means. The current period of inactivity is generally related to the amount of time that the mobile communication device 12 has not been directly engaged in user-related activity. For example, if the user of the mobile communication device 12 has not conducted any calls, requested or sent data, activated any user controls such as a touch screen or a button, or if the user performed any other like tasks, then the current period of inactivity clock or counter increments. The measure on the clock or counter is indicative of the period of inactivity. Along these lines, when a user does perform any such activity, then the clock or counter is reset, which indicates that the mobile communication device 12 is in an active state.

In some cases, a threshold for a current period of inactivity is stored in the memory 40a. The inactivity threshold may be hard-coded, or the inactivity threshold may be a variable that can be programmatically changed by a user or some other electronic device. In one exemplary operation, a current period of inactivity counter is interrogated. Based on a comparison of the inactivity counter to the inactivity threshold, the state of the mobile communication device 12 may be determined to be active or inactive. Certain functions of the mobile device logging and tracking system 10 are carried out depending on whether the state of the mobile communication device 12 is determined to be active or inactive.

Figure 3:
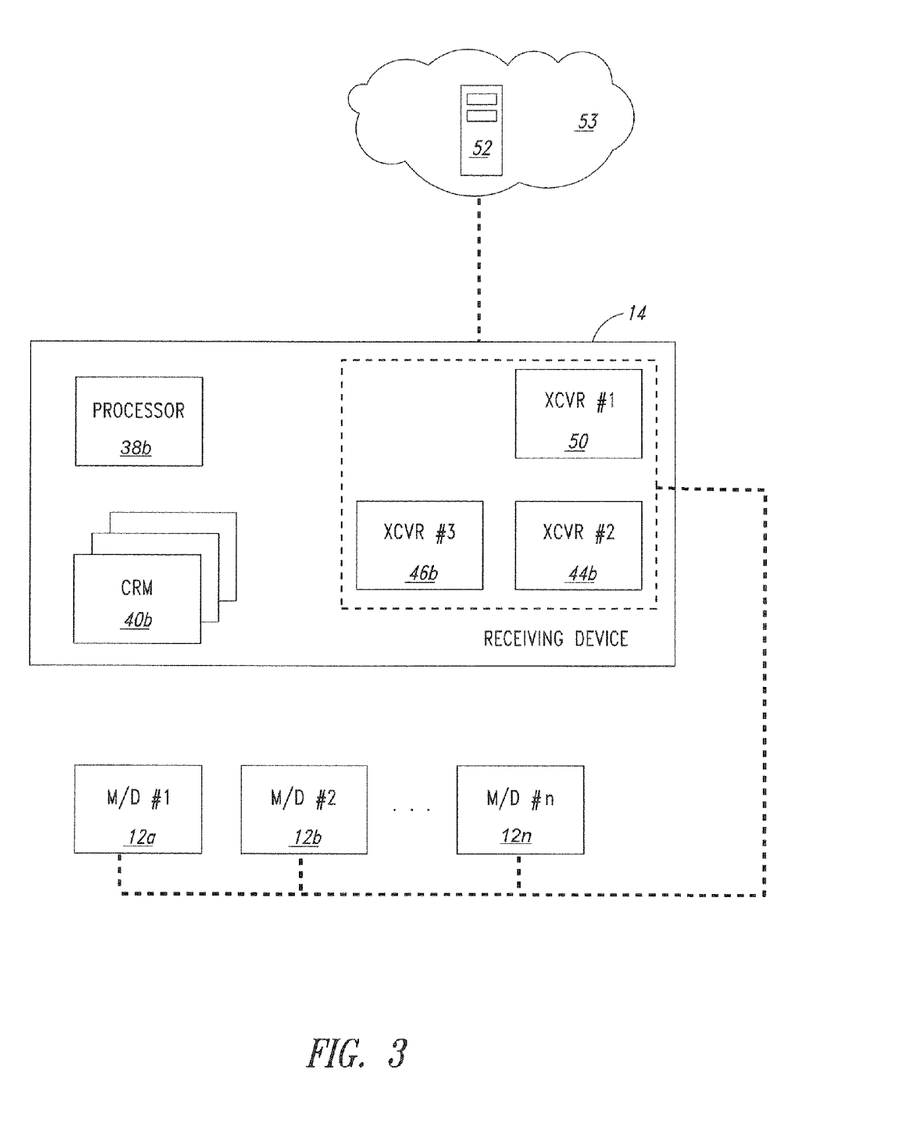
FIG. 3 is a receiving device block diagram.

FIG. 3 is a receiving device block diagram. Receiving devices 14 may be interchangeably referred to by a general device description such as a "television converter," "receiver," "set-top box," "television receiving device," "television receiver," "programming receiver," "television recording device," "satellite set-top box," "satellite receiver," "cable set-top box," "cable receiver," and/or "television tuner." Accordingly, the receiving device 14 may be any suitable converter device or electronic equipment that is operable to receive programming. Further, the receiving device 14 may itself include user interface devices, such as buttons or switches. In many applications, the receiving device 14 may be controlled by a remote device (not shown) in such a manner as to provide enhanced functionality and/or an enhanced presentation of the programming to a user.

The receiving device 14 of FIG. 3 includes a processor 38b. The processor 38b is a processor of the type 38a generally described with respect to FIG. 2. That is, the processor 38b may be one or more of an FPGA, an ASIC, a DSP, or a CPU. The processors 38a, 38b may be, but are not necessarily, identical.

A volatile and/or non-volatile computer readable memory 40b is included in the receiving device 14. The memory 40b is of the type 40a generally described with respect to FIG. 2. The memory 40b may be identical to the memory 40a, or the memory 40b may be different. In some cases, the memory 40b includes components that are internal to the receiving device 14, external to the receiving device 14, or both internal and external to the receiving device 14.

The receiving device 14 will typically also include a first transceiver 50 configured to receive programming. In some cases, the transceiver 50 includes a circuitry for receiving and processing satellite signals. In other cases, the transceiver 50 includes circuitry for receiving and processing cable-delivered signals. In still other cases, transceiver 50 includes circuits for receiving and processing over-the-air (OTA) signals. The transceiver 50 enables the receiving device to receive programming that can be processed and delivered to a presentation device.

A second transceiver 44b of FIG. 3 is configured to couple (i.e., communicatively associate) with the second transceiver 44a of FIG. 2. That is, in embodiments of the mobile device logging and tracking system 10, the receiving device 14 and the mobile device 12 have at least one corresponding transceiver 44a, 44b. The corresponding transceivers are configured to communicate with each other such that information may be passed between the mobile communication device 12 and the receiving device 14.

A third transceiver 46b of the receiving device 14 of FIG. 3 is configured to couple with a transceiver of a computing device 18. In a mobile device logging and tracking system 10, the receiving device 14 is configured to receive and process information related to unanswered calls of a known mobile communication device 12. Under certain conditions, some of the information related to an unanswered call, or other associated information, is communicated to one or more computing devices 18. The communication is facilitated via the third transceiver 46b.

In one example, the computing device 18 is embodied in a smart appliance such as a refrigerator. If a call to a particular mobile communication device 12 is unanswered, certain information is communicated to the receiving device 14 through the second transceiver 44b. The information may be processed and new information may be created. An indication of the unanswered call is then communicated via the third transceiver 46b to a computing device 18 embodied in the refrigerator. The refrigerator may process the information and emit sound, light, vibration, or some other indication of the unanswered call. The refrigerator may also accept information from a user in response to the indication of the unanswered call.

The third transceiver 46b of receiving device 14 may conform to a WiFi protocol, Bluetooth protocol, ZigBee/RF4CE protocol, IEEE 1394 FireWire protocol, USB protocol, Ethernet protocol, Multimedia-Over-Coax Alliance (MoCA) protocol, infrared protocol, ultra-high frequency (UHF), or another wired or wireless protocol. The transceiver 46b of receiving device 14 and a transceiver of the computing device 18 generally cooperate in a personal area network (PAN)

environment or even a peer-to-peer environment to uni-directionally or bi-directionally pass information.

The transceivers of FIG. 3 may be implemented in a single transceiver circuit or multiple transceiver circuits. For example, the receiving device 14 may include a first transceiver 50 that is comprised of a satellite receiver front-end, while the second transceiver 44b may include a WiFi chipset, a Bluetooth chipset, a ZigBee/RF4CE chipset, an infrared output device and detection device, and other separately identifiable logic modules. Generally speaking, the transceivers of FIG. 3 are illustrated as having either programming (e.g., audio/visual television programming) capability or personal area network (PAN) capability, but other configurations of modules are recognized.

The receiving device 14 of FIG. 3 may be configured to communicate with one or more mobile communication devices 12a, 12b, . . . 12n. Each of the illustrated mobile communication devices 12a, 12b, . . . 12n is a device of the mobile communication device 12 of FIGS. 1, 2, and 5. A first mobile communication device 12a may be associated with a first user; a second mobile communication device 12b may be associated with a second user, and so on. A receiving device 14 may store a profile in memory 40b for each of the associated mobile communication devices 12a, 12b, . . . 12n. Each profile may include particular characteristics for a communicative coupling with a respective mobile communication device 12. In addition, each profile may describe or direct the characteristics of communications with the receiving device. For example, a first mobile communications device 12a may direct the receiving device 14 to communicate unanswered calls to a first set of computing devices while a second mobile communications device 12b may direct the receiving device 14 to communicate unanswered calls to a second set of computing devices. In another example, an unanswered call to a first mobile communications device 12a may cause the receiving device 14 to direct a computing device to output a first sound while an unanswered call to a second mobile communications device 12b may cause the receiving device 14 to direct the computing device to output a second sound. Accordingly, each mobile communication device 12a-12n may be associated with its own profile in the receiving device 14, and the profile may call out system-wide unique sets of devices, audio outputs, video outputs, tactile outputs, information (e.g., caller ID, time of missed call, and the like) and other features associated with each particular mobile communication device 12a-12n. The profiles may be manually or programmatically configurable by a user, for example via a user interface.

In some cases, the receiving device 14 may be associated with external computer services 52. The external computer services 52, which may be referred to as "cloud services," "cloud-based computing," "server farms," or other similarly functional external services. In some cases, the external computer services are accessible via the Internet 53 or another wide area network (WAN). The external computer services 52 may be used by the receiving device 14 to store information received or generated within the receiving device 14. In this way, other devices that are remote from the receiving device may have access to the stored information. In one embodiment, information related to an unanswered call is stored by the receiving device 14 on the external computing service 52, which is configured to include a remote computing storage device (not shown). Subsequently, a user (e.g., the owner of the receiving device 14 located in the owner's home) can access the information from another location (e.g., from work) while using a different computing device (e.g., a desktop or laptop computer with an Internet connection).

Figure 4:
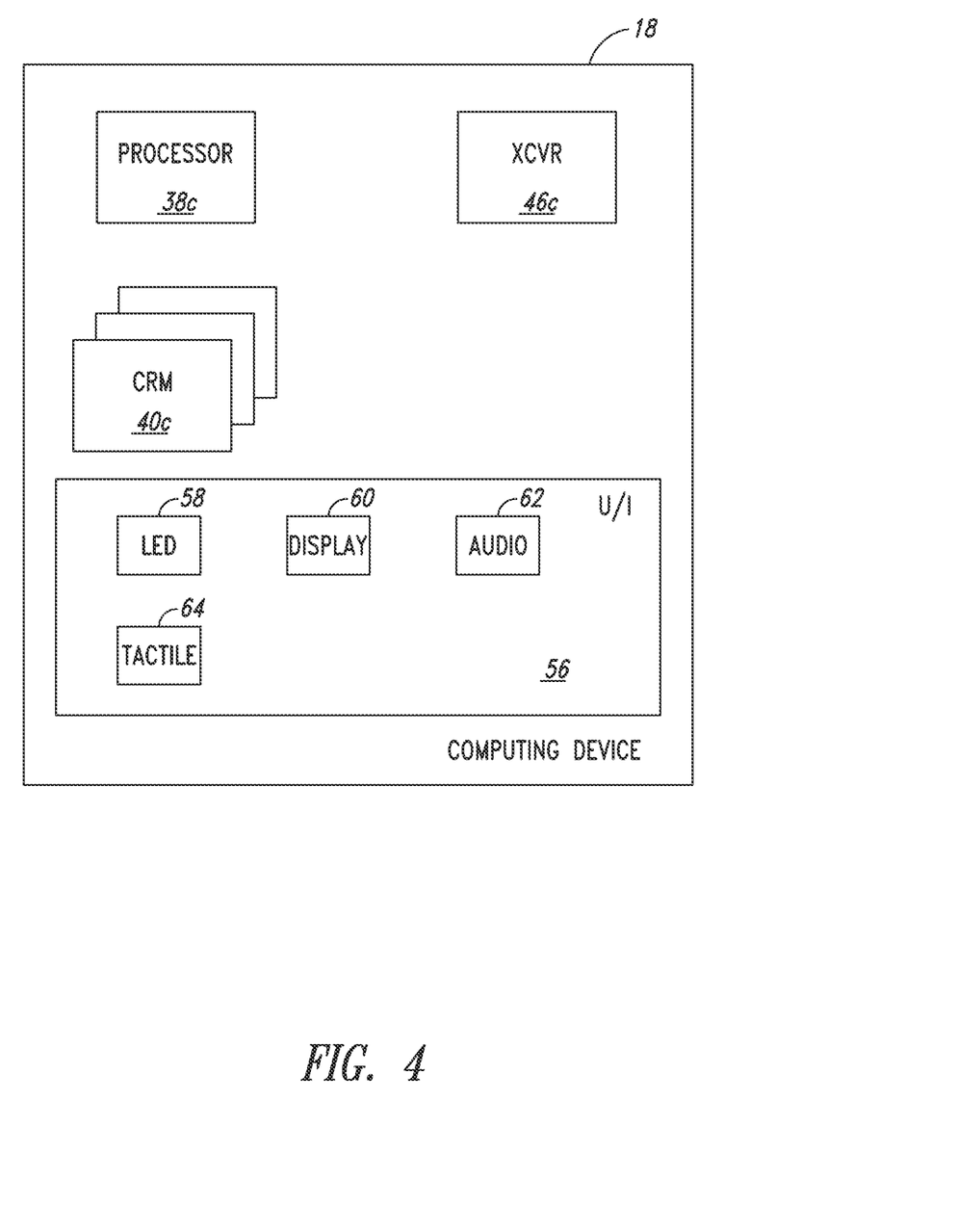
FIG. 4 is a computing device block diagram.

FIG. 4 is a computing device 18 block diagram. A computing device 18 may be embedded in a wide range of devices found in a home, business, public area, private area, or other place. The computing device 18 includes operable logic to receive information from a receiving device 14. As discussed herein, a computing device 18 may be embodied in a mobile communication device (e.g., mobile communication device 12). The computing device 18 may also be embodied in another receiving device (e.g., receiving device 14).

In the present disclosure, computing device embodiments also include appliances such as refrigerators, freezers, cooking appliances, dishwashers, laundry machines; automotive apparatus such as smart car systems, global positioning systems (GPS), automotive entertainment systems; building systems such as heating, ventilation, air conditioning (HVAC) controls, alarm (e.g., security, safety) systems; entertainment devices such as game consoles, audio equipment, video equipment, audio/video equipment, smart picture frames, smart clocks, weather-related devices, personal computers; wearable computing devices such as necklace transceiver devices, bracelet transceiver devices, smart watches, smart glasses, and other mobile and non-mobile devices.

The computing device 18 of FIG. 4 includes a processor 38c. The processor 38c is a processor of the type 38a generally described with respect to FIG. 2. Processor 38c may be one or more of an FPGA, an ASIC, a DSP, a CPU, or some other computing processor. Processor 38c may be, but is not necessarily, identical to processor 38a and processor 38b.

A volatile and/or non-volatile computer readable memory 40c is configured for operation with computing device 18. The memory 40c is a memory of the type 40a generally described with respect to FIG. 2. Memory 40c may be, but is not necessarily, identical to memory 40a and memory 40b. In some cases, the memory 40c includes structures internal to computing device 18, external to the computing device 18, or both internal and external to computing device 18.

The computing device 18 of FIG. 4 includes a transceiver 46c configured to couple (i.e., communicatively associate) with a transceiver 46b of a receiving device 14. In embodiments of the mobile device logging and tracking system 10, the receiving device 14 communicates information associated with an unanswered call of a mobile device 12. Upon receipt of the information, the computing device 18 will generally provide an output indication that can be perceived by a person in proximity to the computing device.

The transceiver 46c of computing device 18 may conform to a WiFi protocol, Bluetooth protocol, ZigBee/RF4CE protocol, IEEE 1394 FireWire protocol, USB protocol, Ethernet protocol, Multimedia-Over-Coax Alliance (MoCA) protocol, infrared protocol, ultra-high frequency (UHF), or another wired or wireless protocol. The transceiver 46b of receiving device 14 and a transceiver of the computing device 18 generally cooperate in a local area network (LAN) environment, a personal area network (PAN) environment or even a peer-to-peer environment. Communication between a receiving device 14 and a computing device 18 may be unidirectional or bidirectional.

The computing device 18 includes a user interface 56 having one or more optional modules. The user interface may optionally include visual modules such as an LED module 58 or a display module 60, an audio module 62 (i.e., input devices such as a microphone and/or output devices such as speakers), and a tactile module 64. In the computing device 18, information associated with an unanswered call to a mobile communication device 12 is passed from a receiving device 14. The computing device may then use one or more of the user interface modules to alert, inform, or accept input from a user that is in proximity of the computing device 18.

It has been recognized that the computing device 18 may be embodied in a wide range of devices. Any such device having the same or similar components as illustrated in FIG. 4 may be used as a computing device 18 in a mobile device logging and tracking system 10.

Figure 5:
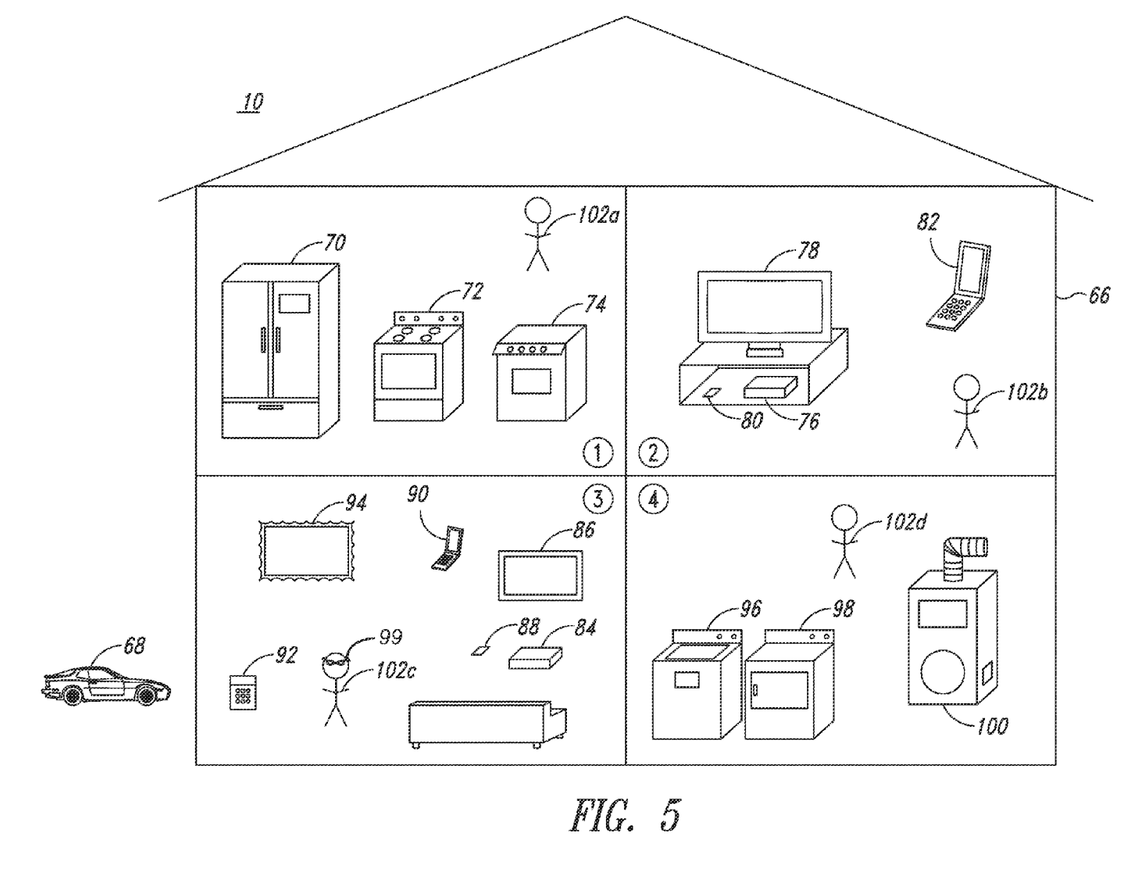
FIG. 5 is a mobile device logging and tracking system embodied in a user's premises.

FIG. 5 is a mobile device logging and tracking system 10 embodied in a user's premises 66. The user's premises 66 may be a business, home, multiple dwelling unit, or other facility or area where programming is delivered to a receiving device 14. A motor vehicle 68 is in proximity of the user's premises 66. The premises 66 is illustrated with four rooms, but any number of rooms could be constructed therein and function within the mobile device logging and tracking system 10. A first room has a smart refrigerator 70, a smart cooking device 72 (e.g. stove, oven, or the like), and a smart cleaning device 74 (e.g., dishwasher). A second room has a first set top box 76 (e.g., receiving device 14), a first display device 78, a first gaming device 80, and a first mobile device 82. A third room has a second set top box 84 (e.g., receiving device 14) and a second display device 86. The third room also has a second gaming device 88, a second mobile device 90, a security system device 92, and a smart picture frame 94. A fourth room has washing machine 96, a clothes dryer 98, and a heating, ventilation, air conditioning (HVAC) device 100. First, second, third, and fourth users 102a-d are optionally present in each room, respectively. In the third room, user 102c is equipped with a wearable computing device 99.

Each of the devices 68-100 illustrated in FIG. 5 includes modules that permit the device to be configured as a computing device 18 (i.e., FIG. 4). That is, in one form or another, each of the devices 68-100 includes a processing unit 38c, a memory 40c, a transceiver 46c, and a user interface 56.

Some user's premises 66 include an optional network, or a networked system, to which receiving devices 14, computing devices 18, and other devices (e.g., mobile communication devices 12) can be coupled. Non-limiting examples of networks used in a mobile device logging and tracking system 10 include, but are not limited to, an Ethernet, twisted pair Ethernet, an intranet, a local area network (LAN) system, or the like. The computing devices of FIG. 5, which include devices 68-100, are communicatively coupled to the network so that the plurality of computing devices may optionally be communicatively coupled together and operable to communicate with each other.

In one non-limiting embodiment of the mobile device logging and tracking system 10 of FIG. 5, a receiving device in the user's premises 66 is configured to log calls made to a mobile device. In the embodiment, more specifically, in the second room, set top box 76 is configured to log calls made to mobile device 82. Also in the embodiment, to facilitate the logging operations, mobile device 82 is configured to pass the information to be logged to set top box 76. The configuration includes acts that direct a communicative association between the set top box 76 and the mobile device 82.

Set top box 76 is arranged as a receiving device 14 of FIG. 3. A transceiver of the set top box 76 includes a profile stored in memory that directs communication with mobile device 82. In one case, the profile that directs communication between set top box 76 and mobile communication device 82 includes information related to a Bluetooth protocol, but other wireless and wired communication protocols could also be followed. Set top box 76 may include profiles for communication with many mobile devices (e.g., mobile communication device 90 in the third room).

Mobile communication device 82 is arranged as a mobile communication device 12 of FIG. 2. That is, the mobile communication device 82 includes a memory arranged to store software instructions, which, when executed by the processor, are arranged to direct the mobile device to perform acts of the mobile device logging and tracking system 10.

In one example, a transceiver in the mobile communication device 82 is a Bluetooth transceiver. Transceivers that conform to other communication protocols may also be used. The mobile communication device 82 stores a profile that defines and directs communication between the mobile communication device 82 and the set top box 76. The mobile communication device 82 may include many profiles that direct communications between the mobile device 82 and other devices such as a second set top box 84, an audio headset (not shown), a gaming device 80, a security system component 92, or many others.

In some cases, the mobile communication device 82 is only able to communicate with one device at a time using the transceiver that will communicatively associate with set top box 76. For example, if the transceiver conforms to a Bluetooth protocol, then the mobile communication device 82 is only dedicated to communications with only one associated external device at a time. The mobile communication device 82 can separately communicate with other external devices using the transceiver, but generally not at the same time. Alternatively, even in cases where a transceiver can conduct two or more concurrent communication sessions, the mobile communication device 82 will still often communicate with only one external device at a time to save computing resources, power, or for other reasons.

In many cases, the mobile communication device 82 will initiate and terminate the communicative association with set top box 76. For example, if the mobile communication device 82 is actively communicating via the transceiver to an audio headset, the mobile communication device 82 may further be programmed to maintain the communicative association with the audio headset and postpone or ignore a communicative association with set top box 76. On the other hand, at a time when the transceiver is idle, the mobile communication device 82 may initiate a communicative association with the set top box 76. In some cases, communicative associations are scheduled. In other cases, communicative associations are based on a particular event such as a fixed or programmable duration of idle time or non-motion time of the mobile communication device 82. In still other cases, an event commonly triggers both the mobile communication device 82 and the set top box 76 to initiate the communicative association. Accordingly, the communicative associations may be synchronous or asynchronous.

The mobile communication device 82 is further configured to carry out acts related to logging unanswered calls. For example, turning back to the embodiment in FIG. 5, the mobile communication device 82 may be associated with user 102a in the first room. In such a case, the user 102a is in room 1 while her mobile communication device 82 is in room 2, out of her hearing range. While the mobile communication device 82 is stationary in room 2, the mobile communication device 82 identifies the current period of inactivity and the current period of non-motion. That is, since user 102a is not manipulating her mobile device via the user interface or in any other way, the mobile device 82 is deemed to be in an inactive state; and since the mobile communication device 82 is not being moved, the mobile device 82 is deemed to be in a non-motion state. The time durations (i.e., thresholds) that must pass before the mobile communication device 82 determines a state of inactivity or non-motion may be the same or they may be different. The time periods may further be fixed or they may be programmable (e.g., via a user interface).

At some point, a friend of user 102a places a telephone call to the mobile communication device 82. The mobile communication device 82 receives an indication of the incoming call. If the incoming call indication is received during a period of inactivity and non-motion, further processing may be performed to carry out the acts of the mobile device logging and tracking system 10.

The further processing in the mobile communication device 82 when the mobile device is inactive and not in motion when an incoming call is received may include another threshold or test to determine whether or not the call is answered at all. In some cases, information pertaining to the incoming call is passed to the set top box 76 while the call is still incoming and answerable. In other cases, the information is only passed to set top box 76 after the call is identified as "missed" (i.e., the caller hangs up, the call is passed to voice mail, the call is "answered" but the user does not speak, and the like).

Upon detection of the unanswered call, the mobile communication device 82 will initiate a communicative link to the set top box 76 according to the communication profile stored in memory. In some cases, a communication request is passed from the mobile communication device 82 and received by the set top box 76. In other cases, information pertaining to the unanswered call is passed in a same message as the request to communicate. In still other cases, no express request for communication to the set top box 76 is necessary, but instead, the mobile communication device merely begins communicating information related to an unanswered call.

Based on certain factors, including the indication of the incoming call, the determined state of inactivity, and the determined state of non-motion, the mobile communication device 82 will pass information associated with the incoming unanswered call to set top box 76. The information passed to the set top box 76 may include contact information retrieved by the mobile communication device 82. For example, the originating call number may be passed, other caller-ID information may be passed such as an image of the caller or information otherwise associated with the caller may be passed, and other like information may also be passed. The information associated with the unanswered call may include a time stamp, a time and date of most recent call, and a business name. The information may also include other call logging information such as missed calls, completed calls, other phone numbers or identification information (e.g., email address) associated with the contact, and other information. In some cases, if the caller has left a text message, voicemail, or video mail, the text/audio/video file may also be passed to the set top box 76.

After the information associated with the unanswered call is passed, the mobile communication device 82 may terminate the communicative link to the set top box 76. If a transceiver of mobile communication device 82 used to communicate to set top box 76 had previously been communicatively coupled to a another different device, the mobile communication device 82 will in some cases reinstate the communicative association with the other different device. For example, the mobile communication device 82 transceiver may have been paired with a headset before the unanswered call was received. In this case, upon determining the unanswered call, the mobile communication device 82 may break the pairing with the headset, establish a pairing with the set top box 76, pass the information to the set top box 76, terminate the pairing with the set top box 76, and re-associate with the headset.

The set top box 76 is configured to perform acts of the mobile device logging and tracking system 10. When the mobile communication device 82 communicatively associates with set top box 76, certain information (i.e., data) about the unanswered call is communicated. The information communicated from the mobile communication device 82 and the processing of the information is directed by the configuration of the set top box 76.

The set top box 76 is configured to receive the information including the indication that a call to the mobile device was not answered. The set top box 76 will store the information in a memory associated with the set top box 76. In some cases, the memory is local to the set top box 76. In other cases, the memory is a network accessible memory arranged for access via a networked computing device. That is, the set top box 76 may store the information from the mobile communication device 82 locally, and alternatively or in addition, the set top box 76 may store the information remotely in a memory associated with external computing services 52 (e.g., a remote computing storage device, FIG. 3) accessible via a wide area network such as the Internet. When the information is stored remotely (e.g., in "the cloud"), a user may be able to access the information associated with the unanswered call from some other location using, for example, a computer connected to the Internet and via accessing a particular website.

Upon receiving information from mobile communication device 82 including an indication that a call to the mobile communication device 82 was unanswered, the set top box 76 is configured to optionally perform one or more acts. The set top box 76 may communicate information associated with the unanswered call to a first electronic device (i.e., FIG. 4). In some cases, the first electronic device may be display or a smart appliance such as a refrigerator, a freezer, a cooking appliance, and a cleaning appliance. In fact, the first device may be any device having properties of the computing device of FIG. 4 including the devices 68-100 illustrated in FIG. 5. In addition to communicating the information to the first computing device, the set top box 76 may communicate the information to a second computing device or any number of additional computing devices.

The set top box 76 may communicate the information to computing devices via a transceiver configured for a direct connection, a local area network, a wide area network, or via some other means. The communication may be via a wired communication path, a wireless communication path, or a combination of wired and wireless communication paths. Communication may be via one or more mediums including WiFi, Bluetooth, ZigBee, IEEE 1394 (i.e., FireWire), USB, Ethernet, MoCA, infrared, UHF, or another communication type.

The communication between a receiving device and computing device may be via message posting, pushed communications, master-slave communications, or by another scheme. That is, the receiving device and the computing device may communicate according to one or more message passing schemes that the devices conform to. For example, in one case, the receiving device and the computing device subscribe to a common messaging server. When one device (e.g., the receiving device) has information or an information request for another device (e.g., a smart appliance), the first device posts a message to the common server and the second device retrieves the message from the same common server. In this scheme, neither device is blocked, and both devices asynchronously post messages and poll for messages. In another example, a first device (e.g., the receiving device) is able to communicate (i.e., push) information directly to a second device (e.g., a smart appliance). In this scheme, the first device controls the communications between both devices. Other schemes to pass information between the computing devices may also be implemented.

In one case, the set top box 76 is configured to communicate information associated with the unanswered call to one or more known devices; that is, devices previously associated with the set top box. The set top box may communicate the information to one or more smart appliances in room 1, for example. If the appliance includes features of the computing device 18 of FIG. 4, then the appliance will receive the information and provide indications of the information via a user interface of the appliance. The indications from the appliance may include LED's that illuminate or flash, certain audio that is output, tactile feedback such as vibration, or other indications.

Once again addressing the embodiment wherein a user 102*a* is in room 1 when her smartphone (i.e., mobile communication device 82) is in room 2, a call to the smartphone is unanswered. The mobile communication device 82 initiates a communicative association with the set top box 76, and the information related to the unanswered call is passed to the set top box 76. The set top box 76 is configured to perform further acts that implement the mobile device logging and tracking system 10. The acts include passing the information to other devices, which then alert the user to the unanswered call via an interface of the other devices. In the example, the set top box 76 is configured to associate with the smart refrigerator 70 in room 1, the display device 78 in room 2, the smart picture frame 94 in room 3, and the washing machine 96 in room 4. The indication of the unanswered call directs the set top box 76 to pass information to each of the associated devices. The smart refrigerator 70, for example, may have a display and LED's in a user interface. The LED's of the refrigerator 70 may flash and the display may indicate the identity of the caller. The smart picture frame 94 in room 3 may display an image of the caller. The washing machine 96 in room 4 may have LED outputs, sound output, or the machine may vibrate to indicate that an incoming call was unanswered. In other embodiments, the set top box 76 may be configured to pass the information to any number of other computing devices.

In another non-limiting embodiment of FIG. 5, the indication of the unanswered call is passed from mobile computing device 82 to set top box 76 while the call is still in progress. That is, the call is still ringing, but mobile communication device 82 has been in states of inactivity and non-motion for a duration that exceeds one or more thresholds. In this case, the set top box determines that the call is still in progress and may possibly be answered by any computing device 18 that includes both audio input and audio output functionality. Thus, the set top box 76 will operate as a pass-thru device wherein the call that is unanswered by the mobile communication device 82 is answered by a computing device associated with the set top box 76. The computing device may be a second mobile communication device. Alternatively, or in addition, the computing device may be another computing device that includes both audio input and audio output functionality such as a wearable computing device.

This second non-limiting embodiment may be further described using exemplary facts already discussed. That is, with respect to FIG. 5, mobile communication device 82 is associated with user 102*a*, who is in the first room while her mobile communication device 82 is in room 2, out of her hearing range. A friend of user 102*a* places a telephone call to mobile communication device 82. The mobile communication device 82 receives an indication of the incoming call, passes a communication to set top box 76, and set top box 76 communicates the indication of the unanswered call to a computing device having audio input and output capabilities. The computing device may be a second mobile communication device 90 in room 3, a wearable computing device 99 attached to user 102*c* in room 3, a GPS or other system in motor vehicle 68, a gaming device 80 or 88, a security system 92, or some other device in rooms 1 to 4. The selected computing device may then answer the call. In this case, the set top box 76 passes communication data from the friend of user 102*a*, between mobile communication device 82 and the selected computing device, through set top box 76, and to one or more selected computing devices.

In one more non-limiting embodiment variation, it has been discovered that the receiving device (e.g., set top box 76) does not need to be fully on or operating to participate in the acts of the mobile device logging and tracking system 10. That is, the receiving device may accept the communicative association with the mobile communication device, receive the data including the indication that a call was unanswered, and store the data when the receiving device appears to be in a powered off mode, a sleep mode, a standby mode, or another like state.

In the embodiments wherein the receiving device appears to be "off," the receiving device may carry out one or more particular acts. For example, the receiving device may continue to appear "off" while the acts are carried out. Alternatively, or in addition, the receiving device may direct an associated presentation device to turn on so that the indication can be displayed to a nearby user. The direction provided by the receiving device to turn on the presentation device may be via a remote control, a wired connection, or via some other means.

Alternatively, the mobile communication device may include remote control capability, and the mobile communication device may direct the presentation device to turn on. In the embodiment, the mobile device may detect its states of inactivity and non-motion, and when a call is received, the mobile device may direct the presentation device to turn on as a remote control. Other acts of the mobile device logging and tracking system 10 may also be carried out such that information associated with the unanswered call may be passed to a receiving device.

In another embodiment, the receiving device is configured to act as a pass-through device using more than a single computing device. For example, in such an embodiment, a set of entertainment system speakers (e.g., Surround sound) may be used to output audio information, and a security system or a remote control device having a microphone may be used to accept audio input.

The security system in this example (or other connected computing devices) may further be used by the mobile device logging and tracking system 10 in other embodiments. Typically, a security system has components located throughout the user's premises 66. The components may include audio input microphones, video cameras, and motion detectors. When an inactive, non-motion mobile communication device receives a call, the indication of the unanswered call may be passed through a receiving device to the security system, or the receiving device may receive information from the security device. Using such information, for example where in the premises a user is located, certain computing devices can be chosen to receive the information. Thus, the receiving device will direct the information associated with the unanswered call to a room and a computing device where a person is believed to be.

Figure 6:
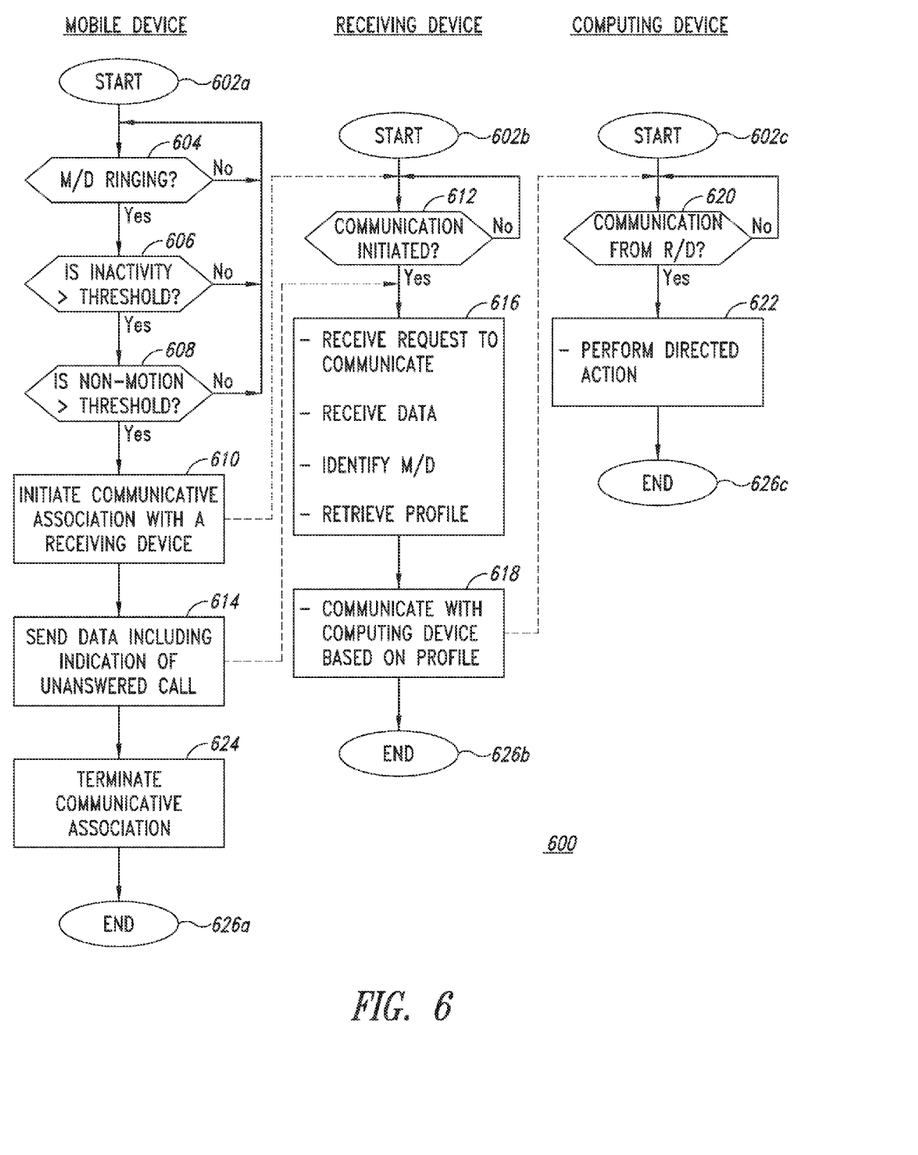
FIG. 6 is a flowchart illustrating a method of a mobile device logging and tracking system.

FIG. 6 is a flowchart illustrating a method of a mobile device logging and tracking system 600. Separate tracks of operations are illustrated for a mobile device, a receiving device, and a computing device. In many cases, operations will commence in a plurality of a mobile devices and a plurality of computing devices.

The mobile device operations of FIG. 6 may be performed in one or more mobile communication device 12 illustrated and described with respect to FIGS. 1, 2, and 5.

The receiving device operations of FIG. 6 may be performed in a receiving device 14 illustrated and described with respect to FIGS. 1, 3, and 5.

The computing device operations of FIG. 6 may be performed in a computing device 18 illustrated and described with respect to FIGS. 1, 4, and 5.

Processing begins in the mobile device, the receiving device, and the computing device at 602a, 602b, and 602c, respectively. At 604, the mobile device determines if there is an incoming call. If not, the processing in the mobile device remains at 604. If a call is incoming at 604, the mobile device determines if the call is unanswered. A call is determined to be unanswered if the mobile device is inactive for a duration longer than a first threshold 606 and if the mobile device is not in motion for a duration longer than a second threshold 608. If the call to the mobile device is not determined to be unanswered, processing continues at 604.

If the call to the mobile device is determined to be unanswered, processing continues at 610 wherein a communicative association with a receiving device is initiated.

At 612, the receiving device is waiting for communications with the mobile device to be initiated. The receiving device remains pending at 614 until a communicative association is formed with the mobile device.

At 614, the mobile device sends data including an indication of an unanswered call to the receiving device.

At 616, the receiving device receives from the mobile device a request to communicate. The receiving device receives data from the mobile device and, from the data, identifies the mobile device and retrieves a profile based on the identification of the mobile device. At 618, the receiving device performs acts associated with the particular mobile device and directed by the mobile device profile. The acts include communicating with the computing device based on the profile.

At 620, the computing device is waiting for communications from the receiving device. The computing device waits at 620 until the receiving device commences communications. At 622, the computing device performs the actions directed by the receiving device.

At 624, the mobile device has completed sending data to the receiving device, and the mobile device terminates the communicative association with the receiving device.

Processing ends for the mobile device, receiving device, and computing device at 626a, 626b, and 626c, respectively.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments. Aspects of the embodiments can be modified and changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to log calls to a mobile device, comprising:
communicatively associating the mobile device with a receiving device;
receiving data with the receiving device from the mobile device, the data including an indication that a call to the mobile device was not answered;
storing the data in a memory associated with the receiving device; and
communicating information associated with the data from the receiving device via a local area network to a smart appliance, the smart appliance being one of a refrigerator, a freezer, a cooking appliance, and a cleaning appliance.

2. The method of claim 1 wherein the act of receiving data is conditioned on the mobile device being inactive during a time that an indication of the call to the mobile device was available on the mobile device.

3. The method of claim 1 wherein the communicative associating, the receiving, and the storing acts are performed when the receiving device appears to be in a powered off mode, a sleep mode, or a standby mode.

4. The method of claim 1, comprising:
communicating information associated with the data to a second electronic device.

5. The method of claim 4 wherein the second electronic device is a display.

6. The method of claim 1 wherein the memory is a network accessible memory arranged for access via a networked computing device.

7. The method of claim 1, comprising:
communicating information associated with the data to a first electronic device via a wide area network.

8. The method of claim 1 wherein a communicative association between the mobile device and the receiving device is initiated and terminated by the mobile device.

9. A receiving device, comprising:
a first transceiver configured to be communicatively coupled to at least one mobile device;
a second transceiver configured to communicate data to a smart appliance, the smart appliance being one of a refrigerator, a freezer, a cooking appliance, and a cleaning appliance, the data indicating that a call to the at least one mobile device is unanswered;
a processing unit configured to direct the receiving device to:
   accept a communication request from the at least one mobile device via the first transceiver;
   accept information from the at least one mobile device via the first transceiver, the information associated with the call to the at least one mobile device that is unanswered; and
   transmit an indication of the unanswered call to the smart appliance via the second transceiver.

10. The receiving device of claim 9 wherein the processing unit is configured to further direct the receiving device to:
   operate as a pass-thru device wherein the call to the at least one mobile device that is unanswered is answered by a second mobile device and data is communicated between the at least one mobile device and the second mobile device through the receiving device.

11. The receiving device of claim 9 wherein the processing unit is configured to further direct the receiving device to:
   communicate the indication of the unanswered call to a remote computing storage device.

12. The receiving device of claim 9 wherein the first transceiver is configured for communicative coupling via a personal area network.

13. A non-transitory computer readable medium arranged to store software instructions, the software instructions, when executed by a processor of a mobile device, arranged to direct the mobile device to perform acts comprising:
   storing a communication profile, the communication profile defining an association with a receiving device, the profile further defining communication of information associated with the mobile device to a smart appliance associated with the receiving device, the receiving device configured to perform functions of a television programming set-top box;
   identifying a current period of inactivity;
   identifying a current period of non-motion;
   receiving an indication of an incoming call during the current period of inactivity and the current period of non-motion;
   communicatively recognizing that the mobile device is in close proximity to the receiving device;
   initiating a communicative link to the receiving device according to the communication profile and based on the received indication of the incoming call; and
   communicating information associated with the incoming call to the receiving device via the communicative link according to the stored communication profile, the information including an indication that the incoming call is an unanswered call.

14. The non-transitory computer readable medium of claim 13 wherein the software instructions, when executed by the processor of the mobile device, are further arranged to direct the mobile device to perform acts comprising:
   terminating the communicative link to the receiving device after communicating the information associated with the incoming call to the receiving device.

15. The non-transitory computer readable medium of claim 13 wherein the software instructions, when executed by the processor of the mobile device, are further arranged to direct the mobile device to perform acts comprising:
   programmatically storing a first value, the first value setting a time threshold to establish the current period of inactivity; and
   programmatically storing a second value, the second value setting a time threshold to establish the current period of non-motion.

16. The non-transitory computer readable medium of claim 13 wherein the software instructions, when executed by the processor of the mobile device, are further arranged to direct the mobile device to perform the act of initiating the communicative link to the receiving device only after the incoming call is identified as a missed call.

17. The non-transitory computer readable medium of claim 13 wherein the software instructions, when executed by the processor of the mobile device, are further arranged to direct the mobile device to perform the act of communicating information associated with the incoming call to include a time stamp, a source identifier of the incoming call, and an image associated with the source identifier of the incoming call.

* * * * *